(12) United States Patent
Long et al.

(10) Patent No.: US 9,313,250 B2
(45) Date of Patent: Apr. 12, 2016

(54) AUDIO PLAYBACK METHOD, APPARATUS AND SYSTEM

(71) Applicant: TENCENT TECHNOLOGY (SHENZHEN) COMPANY LIMITED, Shenzhen (CN)

(72) Inventors: Xingping Long, Shenzhen (CN); Hong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 61 days.

(21) Appl. No.: 14/261,782

(22) Filed: Apr. 25, 2014

(65) Prior Publication Data

US 2014/0358264 A1 Dec. 4, 2014

Related U.S. Application Data

(63) Continuation of application No. PCT/CN2013/089580, filed on Dec. 16, 2013.

(30) Foreign Application Priority Data

Jun. 4, 2013 (CN) .......................... 2013 1 0218821

(51) Int. Cl.
*G06F 17/00* (2006.01)
*H04L 29/06* (2006.01)
(Continued)

(52) U.S. Cl.
CPC .............. *H04L 65/80* (2013.01); *H04L 1/1838* (2013.01); *H04L 29/06027* (2013.01); *H04L 43/087* (2013.01); *H04L 43/0852* (2013.01); *G10H 2240/00* (2013.01)

(58) Field of Classification Search
CPC . H04L 43/00; H04L 43/0829; H04L 43/0852; H04L 43/087; H04L 29/06027; H04L 65/80
See application file for complete search history.

(56) References Cited

U.S. PATENT DOCUMENTS 7,953,069 B2 5/2011 Connor
2007/0242662 A1 10/2007 Connor
(Continued)

FOREIGN PATENT DOCUMENTS

CN 1671124 A 9/2005
CN 1756230 A 4/2006
(Continued)

OTHER PUBLICATIONS

The World Intellectual Property Organization (WIPO) International Search Report for PCT/CN2013/089580 Mar. 20, 2014.
(Continued)

*Primary Examiner* — Andrew C Flanders
(74) *Attorney, Agent, or Firm* — Anova Law Group, PLLC

(57) ABSTRACT

An audio playback method is provided. The method includes identifying a captured audio data frame according to a type of the audio data frame and sending the identified audio data frame to an audio receiving end. The method also includes receiving the audio data frame that is identified according to the type of the audio data frame and determining the type of the audio data frame and evaluating network transmission status based on the identification. Further, the method includes adjusting a threshold value of a jitter buffer that is used to cache the audio data frame when the type of the audio data frame is a music frame and evaluation result of the network transmission status does not meet a preset transmission baseline condition.

15 Claims, 5 Drawing Sheets

(51) Int. Cl.
*H04L 12/26* (2006.01)
*H04L 1/18* (2006.01)

(56) References Cited

U.S. PATENT DOCUMENTS

| | | |
|---|---|---|
| 2007/0263672 A1 | 11/2007 | Ojala et al. |
| 2011/0194449 A1* | 8/2011 | Connor ............... H04L 12/2602 370/252 |
| 2012/0265523 A1* | 10/2012 | Greer .................... G10L 19/005 704/201 |
| 2014/0072000 A1* | 3/2014 | Shiva ..................... H04J 3/062 370/516 |
| 2014/0310008 A1* | 10/2014 | Kang ...................... G10L 19/00 704/500 |

FOREIGN PATENT DOCUMENTS

| | | |
|---|---|---|
| CN | 101854308 A | 10/2010 |
| CN | 102739503 A | 10/2012 |
| CN | 102761468 A | 10/2012 |
| CN | 103259803 A | 8/2013 |

OTHER PUBLICATIONS

The State Intellectual Property Office of the People's Republic of China (SIPO) Office Action 1 for 2013-102188218 Jul. 6, 2015.

* cited by examiner

AUDIO PLAYBACK METHOD, APPARATUS AND SYSTEM

CROSS-REFERENCES TO RELATED APPLICATIONS

This application is a continuation application of PCT Patent Application No. PCT/CN2013/089580, filed on Dec. 26, 2013, which claims priority of Chinese Patent Application No. 201310218821.8, filed on Jun. 4, 2013, the entire contents of all of which are incorporated by reference herein.

FIELD OF THE INVENTION

The present invention generally relates to audio processing technologies and, more particularly, to audio playback methods, apparatuses and systems.

BACKGROUND

The Internet and instant messaging technologies play an ever more important role in people's daily life, studying and working Moreover, with the development of the mobile Internet technologies, the Internet is increasingly mobile. In today's information age, various information devices come into being, for example, landline telephones and mobile phones for voice transmissions, servers and personal computers (PCs) for sharing and processing information resources, all kinds of TVs for displaying video data, and so on. These devices are invented to address the actual needs arising in specific fields.

With the convergence of consumer electronics, computers, and communication (3C), people are increasingly researching the comprehensive utilization of information equipment in different areas in order to make full use of the existing resources and facilities to better serve people.

Various voice processing applications have become an indispensable part of the daily routine and entertainment life of network users. The users can play along with real-time voice communications and music in a group, making music concerts and communications similar to traditional KTV. In general, audio frames are transmitted over the Internet. Due to the presence of jitters in the transmission of the Internet, audio frame playback is not smooth. Especially, the auditory system is particularly sensitive to musical audio frames. The playback of the musical audio frames needs to be restored even more realistically after the audio is transmitted over the Internet.

However, in existing technologies, various voice processing applications in network communications and playback that involve audio frames do not distinguish between speech frames and music frames. The speech frames and music frames are treated equally. The playback duration of the speech frames and music frames are the same, causing the music to play back not smoothly or causing long delays in the playback of voice communication. Moreover, in the case of relatively large network transmission jitters and more packet losses, the musical frame playback often is not smooth, and realistic effect cannot be achieved.

The disclosed method and server are directed to solve one or more problems set forth above and other problems.

BRIEF SUMMARY OF THE DISCLOSURE

One aspect of the present disclosure includes an audio playback method. The method includes identifying a captured audio data frame according to a type of the audio data frame and sending the identified audio data frame to an audio receiving end. The method also includes receiving the audio data frame that is identified according to the type of the audio data frame and determining the type of the audio data frame and evaluating network transmission status based on the identification. Further, the method includes adjusting a threshold value of a jitter buffer that is used to cache the audio data frame when the type of the audio data frame is a music frame and evaluation result of the network transmission status does not meet a preset transmission baseline condition.

Another aspect of the present disclosure includes an audio playback apparatus. The apparatus includes an audio data frame receiving unit configured to receive an audio data frame and a network transmission status evaluation unit configured to evaluate network transmission status of the audio data frame. The apparatus also includes a data frame type determination unit configured to, based on an identification of the audio data frame, determine a type of the audio data frame. Further, the apparatus includes a jitter buffer adjustment unit configured to, when the type of the audio data frame is a music frame and evaluation result of the network transmission status does not meet a preset transmission baseline condition, adjust a threshold value of a jitter buffer that is used to cache the audio data frame.

Another aspect of the present disclosure includes an audio playback system. The system includes an audio sending apparatus and an audio receiving apparatus. The audio sending apparatus is configured to capture an audio data frame, identify the captured audio data frame according to a type of the audio data frame, and send the identified audio data frame to the audio receiving apparatus. The audio receiving apparatus is configured to receive the identified audio data frame, determine the type of the audio data frame based on an identification, and evaluate network transmission status, where, when the type of the audio data frame is a music frame and evaluation result of the network transmission status does not meet a preset transmission baseline condition, a threshold value of the jitter buffer that is used to cache the audio data frame is adjusted.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions of the present disclosure, the figures which are needed to be used in the description of the present disclosure or the existing technology are briefly described in the following. Obviously, the figures in the following description are only some embodiments of the present disclosure, and it is easily for those skilled in the art to obtain other figures based on the following figures without creative work.

DETAILED DESCRIPTION

Reference will now be made in detail to exemplary embodiments of the disclosure, which are illustrated in the accompanying drawings.

In existing technologies, network communications and playback processes that involve audio frames do not distinguish between speech frames and music frames. The speech frames and music frames are treated equally. The playback duration of the speech frames and music frames are the same, causing the music to playback not smoothly or causing long delays in the playback of voice communication. Moreover, in the case of relatively large network transmission jitters and more packet losses, the musical frame playback is not smooth, and realistic effect cannot be achieved.

Based on the type of the audio data frame, network jitter and packet loss rate, a threshold value of the jitter buffer that is used to cache the audio data frame is estimated and set. When the type of the audio data frame is a music frame and the packet loss rate of the audio data frame is higher than a preset threshold of the packet loss rate, the threshold value of the jitter buffer that is used to cache the audio data frame is increased. Thus, more time may be provided for retransmitting the networking audio packets by increasing the threshold value of the jitter buffer that is used to cache the audio data frame. At the same time, a larger threshold value of the jitter buffer can smooth more and larger network jitters.

After receiving the identified audio data frame, based on the identification, an audio receiving end determines the type of the audio data frame and evaluates network transmission status. When the type of the audio data frame is a music frame and evaluation result of the network transmission status does not meet a preset transmission baseline condition, a threshold value of the jitter buffer that is used to cache the audio data frame is adjusted.

Figure 7:
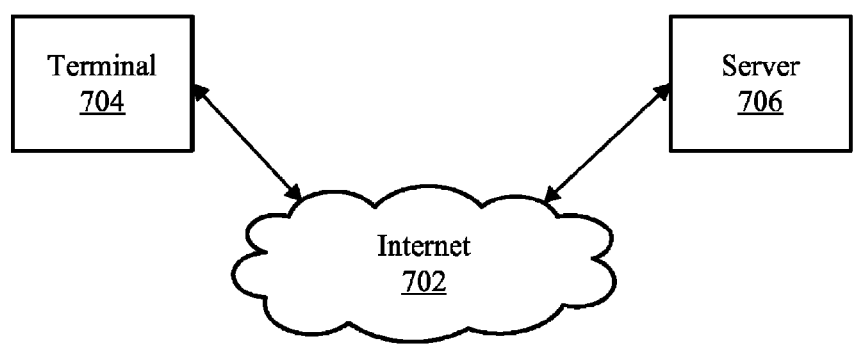
FIG. 7 shows an environment incorporating certain aspects of the present invention.

FIG. 7 shows an environment incorporating certain aspects of the present invention. As shown in FIG. 7, environment 700 may include a terminal 704, a server 706, and the Internet 702. The terminal 704 may access the server 706 through the Internet 702 for certain personalized services provided by the server 706. Although only one server 706 and one terminal 704 is shown in the environment 700, any number of terminals 704 or servers 706 may be included, and other devices may also be included.

The Internet 702 may include any appropriate type of communication network for providing network connections to the terminal 704 and server 706 or among multiple terminals 704 and servers 706. For example, Internet 702 may include the Internet or other types of computer networks or telecommunication networks, either wired or wireless.

A terminal, as used herein, may refer to any appropriate user terminal with certain computing capabilities, such as a personal computer (PC), a work station computer, a server computer, a hand-held computing device (tablet), a smart phone or mobile phone, or any other user-side computing device. In certain embodiments, terminal 704 may be a wireless terminal, such as a smart phone, a tablet computer, or a mobile phone, etc. Terminal 704 may be implemented on any appropriate computing platform.

A server, as used herein, may refer one or more server computers configured to provide certain web server functionalities to provide certain audio playback services. A server may also include one or more processors to execute computer programs in parallel.

Figure 8:
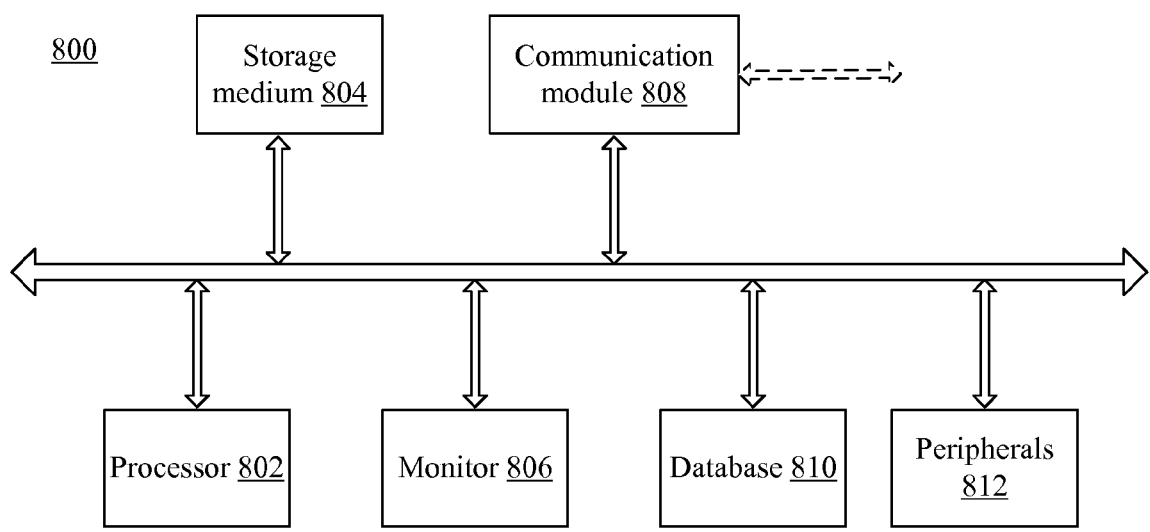
FIG. 8 shows a block diagram of an exemplary computing system according to the disclosed embodiments.

FIG. 8 shows a block diagram of an exemplary computer system 800 capable of implementing the audio playback system.

As shown in FIG. 8, computer system 800 may include a processor 802, a storage medium 804, a monitor 806, a communication module 808, a database 810, and peripherals 812. Certain devices may be omitted and other devices may be included.

Processor 802 may include any appropriate processor or processors. Further, processor 802 can include multiple cores for multi-thread or parallel processing. Storage medium 504 may include memory modules, such as ROM, RAM, flash memory modules, and erasable and rewritable memory, and mass storages, such as CD-ROM, U-disk, and hard disk, etc. Storage medium 804 may store computer programs for implementing various processes, when executed by processor 802.

Further, peripherals 812 may include I/O devices such as keyboard and mouse, and communication module 808 may include network devices for establishing connections through the communication network. Database 810 may include one or more databases for storing certain data and for performing certain operations on the stored data, such as database searching.

Figure 1:
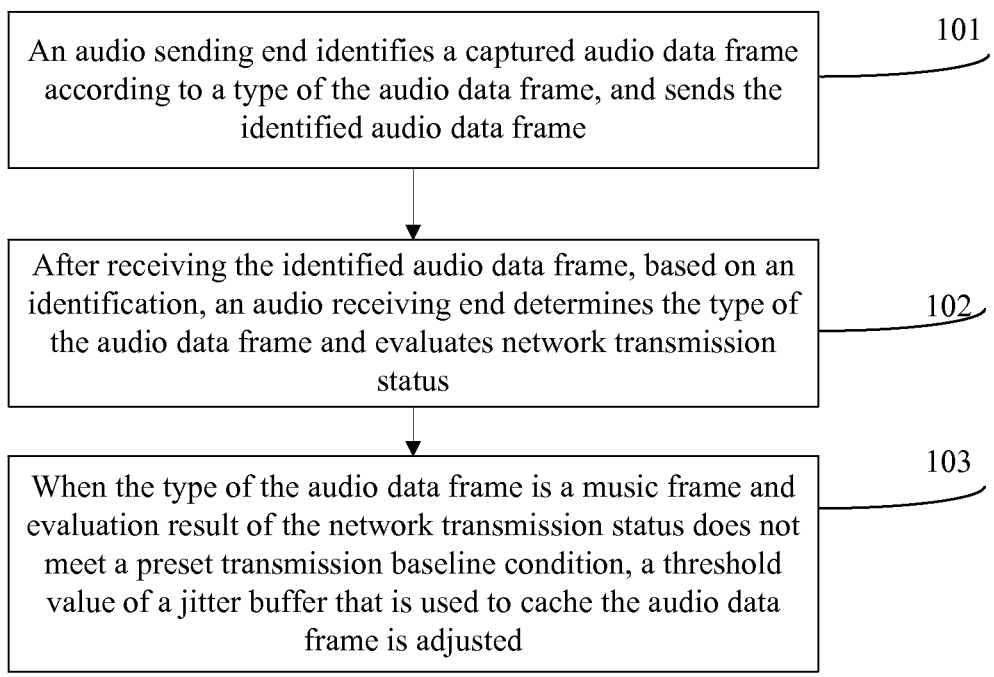
FIG. 1 illustrates a flow chart of an exemplary audio playback process consistent with the disclosed embodiments.

In operation, computer system 800 may run a web browser and perform certain service for audio playback. FIG. 1 illustrates a flow chart of an exemplary audio playback process consistent with the disclosed embodiments.

As shown in FIG. 1, the process may include the following steps.

Step 101: an audio sending end identifies a captured audio data frame according to a type of the audio data frame, and sends the identified audio data frame.

An audio sending end may refer to any device or software program (e.g., a terminal, a client on the terminal, a server, or a program on the server) that configured to generate or obtain audio frames and to send the audio frames over various network (e.g., the Internet). The audio sending end may use various audio capture devices (such as a sound card device) to capture audio frames. The audio sending end can capture a variety of frames, which may include but be not limited to speech frames, mute frames and music frames, and so on.

The speech frame generally refers to the audio frame that contains human speech. The music frame generally refers to the audio frame with some accompaniment. Typically, a spectrum contained in the music frame is wider than the spectrum contained in the speech frame.

Further, the type of the captured audio data frame can be determined by using various algorithms which are used to distinguish between the speech frame and the music frame, such as a Speech & Audio Detection (SAD) algorithm. The captured audio data frame is then identified according to the determined type. The SAD algorithm is used to perform audio activity detection for the speech frame and the music frame. That is, the SAD algorithm may detect whether a segment of audio frame is the speech frame or the music frame.

For example, the frame energy of the audio data frame can be calculated and compared with a preset frame energy threshold value. If the frame energy is lower than the preset frame energy threshold value, the audio data frame is identified as a mute frame.

If the frame energy is higher than the preset frame energy threshold value, the speech probability density Ps and the music probability density Pm of the audio data frame are further calculated. If Ps/Pm is higher than a preset threshold value, the audio data frame is identified as a speech frame; if Ps/Pm is not higher than the preset threshold value, the audio data frame is further jointly judged and identified according to the type of the audio data frame based on the jointly judging result.

After the captured audio data frame is identified according to the type, the identified audio data frame may be sent through various networks to an audio receiving end. The audio receiving end may refer to any device or software program (e.g., a terminal, a client on the terminal, a server, or a program on the server) that configured to receive audio frames over various network (e.g., the Internet).

Step 102: after receiving the identified audio data frame, based on the identification, the audio receiving end determines the type of the audio data frame and evaluates network transmission status. The evaluation of the network transmission status may include, but not limited to, the evaluation of packet loss rate and network jitter index.

Firstly, the audio receiving end receives the identified audio data frame through networks. Then, based on the identification, the audio receiving end determines the type of the audio data frame and evaluates the network transmission status. The network transmission status may include packet loss rate of the audio data frame or network jitter index.

A packet loss rate (also called loss tolerance) refers to a ratio of the number of loss data packets to the number of sending data packets during the transmission of audio frame packets. Packet loss occurs when one or more packets of data travelling across a computer network fail to reach their destination. The packet loss rate generally relates to the length of the audio data packet and the frequency of packet transmission.

Network jitter is an important quality of service (QOS) factor in assessment of network performance. In the context of computer networks, network jitter is the variation in latency as measured in the variability over time of the packet latency across a network. Network jitter is expressed as an average of the deviation from the network mean latency. If network congestion occurs, queuing delay affects end-to-end delay and results in different group delays transmitted by the same connection.

Step 103: when the type of the audio data frame is a music frame and evaluation result of the network transmission status does not meet a preset transmission baseline condition, a threshold value of a jitter buffer that is used to cache the audio data frame is adjusted.

In order to smooth delay jitter, a jitter buffer mechanism is required for ensuring a continuous play-out of voice data. That is, the jitter buffer is needed to smooth over the distribution of packet delay. The jitter buffer may eliminate jitter caused by transmission delays in an Internet telephony network. A buffer area is generally set as the jitter buffer to solve the jitter caused by network transmission. The received packets are temporarily stored in the buffer area after arrival. Only when the buffer area is full, the audio frames are played to ensure the smooth playing of the audio frames.

The jitter buffer temporarily stores arriving packets in order to minimize delay variations. If the packets arrive too late, the packets are discarded. If a jitter buffer is too small, an excessive number of packets may be discarded, which can lead to call quality degradation. If a jitter buffer is too large, the additional delay can lead to conversational difficulty.

In voice over IP (VoIP), the jitter buffer is a shared data area where voice packets can be collected, stored, and sent to the voice processor in evenly spaced intervals. Variations in packet arrival time, called jitter, can occur because of network congestion, timing drift, or route changes. The jitter buffer, which is located at the receiving end of the voice connection, intentionally delays the arriving packets so that the end user experiences a clear connection with very little sound distortion.

There are two kinds of jitter buffers, static jitter buffer and dynamic jitter buffer. A static jitter buffer is hardware-based and is configured by the manufacturer. That is, configuring static playout delay limits the size of the buffer. A dynamic jitter buffer is software-based and can be configured by the network administrator to adapt to changes in the network's delay. That is, the size of the jitter buffer and the amount of delay applied are adjusted upward or downward, as needed. This adjustment ensures the smooth transmission of audio frames within the minimum and maximum limits that the user may configure.

There are many kinds of methods to adjust the jitter buffer threshold. For example, a jitter buffer threshold may be adjusted based on the packet loss rate or network jitter index. The details for adjusting the jitter buffer threshold include the followings.

In one embodiment, in Step 102, the evaluation of network transmission status is to calculate the packet loss rate of the audio data frame by a packet sequence number. At this time, when the type of the audio data frame is a music frame and the packet loss rate of the audio data frame is higher than a preset threshold of the packet loss rate, the threshold value of the jitter buffer that is used to cache the audio data frame is increased.

Therefore, in the case of poor network transmission status caused by the relatively high packet loss rate, more time may be provided for retransmitting the networking audio packets by increasing the threshold value of the jitter buffer that is used to cache the audio data frame. At the same time, a larger threshold value of the jitter buffer can smooth more and larger network jitters.

In one embodiment, in Step 102, the evaluation of network transmission status is to calculate the network jitter index by packet arrival time. At this time, when the type of the audio data frame is a music frame and the network jitter index is higher than a preset threshold of the network jitter index, the threshold value of the jitter buffer that is used to cache the audio data frame is increased.

Therefore, in the case of poor network transmission status caused by the relatively large network jitter, more time may be provided for retransmitting the networking audio packets by increasing the threshold value of the jitter buffer that is used to cache the audio data frame. At the same time, a larger threshold value of the jitter buffer can smooth more and larger network jitters.

In one embodiment, in Step 102, the evaluation of network transmission status is to calculate the packet loss rate of the audio data frame by the packet sequence number and to calculate the network jitter index by the packet arrival time. At this time, when the type of the audio data frame is a music frame, the packet loss rate of the audio data frame is higher than the preset threshold of the packet loss rate, and the network jitter index is higher than the preset threshold of the network jitter index, the threshold value of the jitter buffer that is used to cache the audio data frame is increased.

Therefore, in the case of poor network transmission status caused by the relatively high packet loss rate and the relatively large network jitter, more time may be provided for retransmitting the networking audio packets by increasing the threshold value of the jitter buffer that is used to cache the audio data frame. At the same time, a larger threshold value of the jitter buffer can smooth more and larger network jitters.

Thus, for different types of audio frames (a speech frame or a music frame), the threshold value of a jitter buffer can be adjusted during a playback process. For a music frame that is susceptible to interference, in the case of poor network transmission status, playback fluency of the music frames is improved by intentionally increasing the threshold value of the jitter buffer, and the audio playback latency is also lowered.

Figure 2:
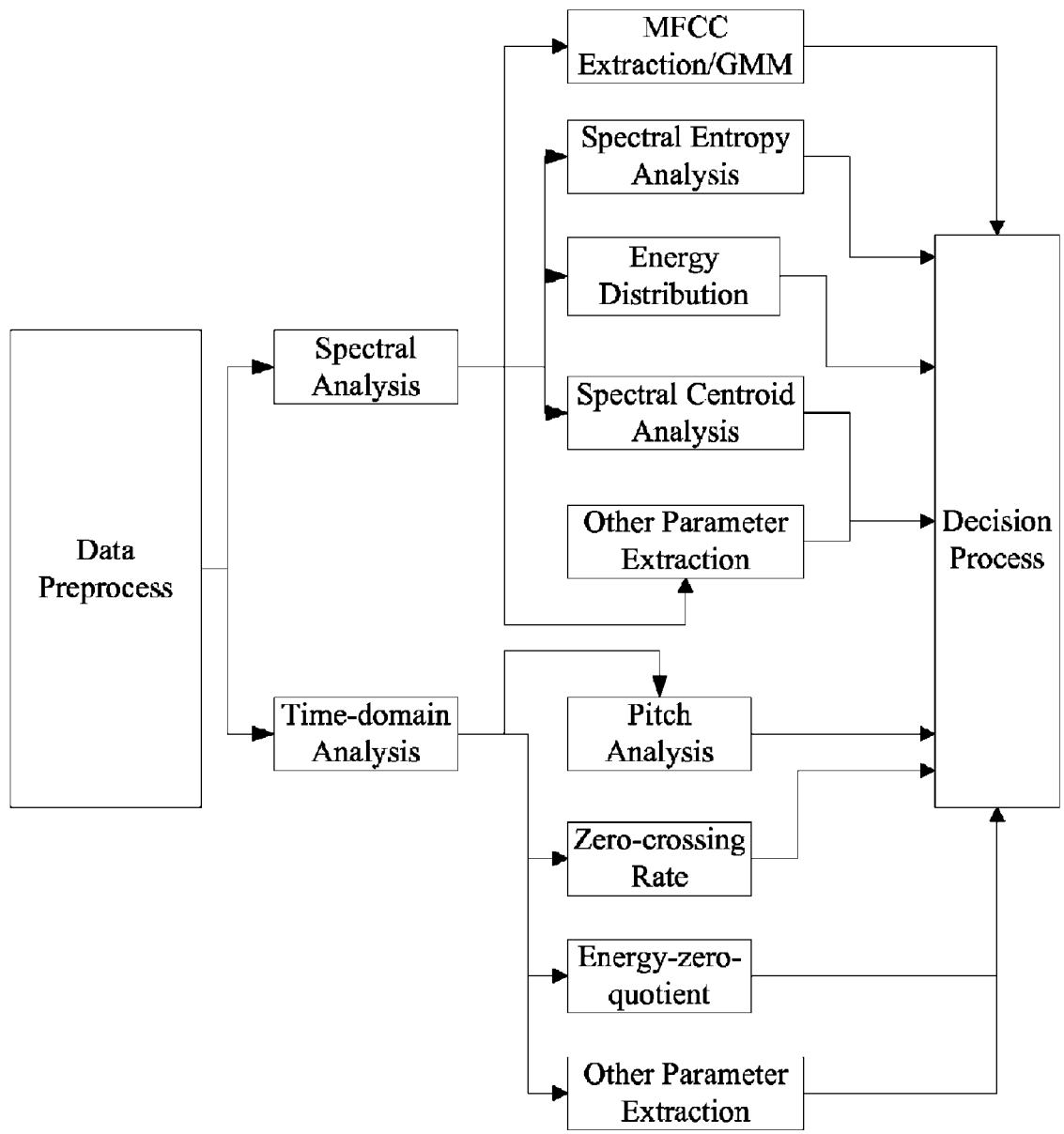
FIG. 2 illustrates a detection flow chart of an exemplary SAD algorithm consistent with the disclosed embodiments.

FIG. 2 illustrates a detection flow chart of an exemplary Speech & Audio Detection (SAD) algorithm consistent with the disclosed embodiments.

As shown in FIG. 2, at the beginning, a preprocess operation, including pre-filter and noise reduction, is performed on the captured data. Then, time-domain and frequency-domain analysis are performed on the preprocessed data, respectively.

The time-domain analysis may include determining pitch, pitch standard deviation, zero-crossing rates (ZCR), and energy-zero-quotient (EZQ), etc. For example, the ZCR in the music frame is greater than the ZCR in the speech frame.

The frequency-analysis may include first performing Fast Fourier Transform (FFT) algorithm and then determining Mel frequency cepstral coefficients (MFCC), spectral entropy, energy distribution in the energy spectral density, spectral centroid of a signal, and a spectral width coefficient, etc., based on the spectrum coefficients.

Next, the determined time-domain and frequency-domain coefficients are inputted to a decision-making module. Finally, a type flag of the frame is outputted. The judgment result from decision-making module is correspondingly smoothed to ensure that the results are not frequently switched.

Figure 3:
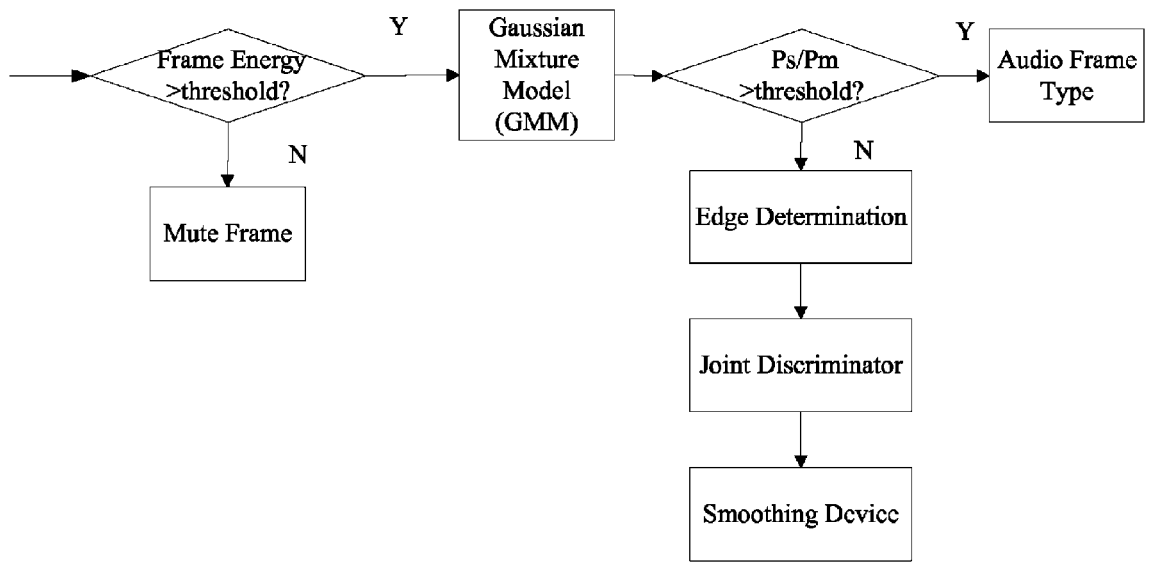
FIG. 3 illustrates a decision flow chart of an exemplary SAD algorithm consistent with the disclosed embodiments.

FIG. 3 illustrates a decision flow chart of an exemplary SAD algorithm consistent with the disclosed embodiments.

As shown in FIG. 3, at the beginning, frame energy is calculated and whether the frame energy is higher than a preset energy threshold is determined. If the frame energy is not higher than the preset energy threshold, a mute frame is returned. If the frame energy is higher than the preset energy threshold, MFCC of 12 dimensions is inputted to Gaussian Mixture Model (GMM) to calculate respectively the speech probability density Ps and the music probability density Pm of the audio data frame. If Ps/Pm is higher than a preset fixed threshold, the current audio data frame is determined as a speech frame; if Ps/Pm is not higher than the preset threshold, the current audio data frame is further judged whether the clock edge of the frame is a rising edge or a falling edge. The current frame is determined as the speech frame or the music frame by combining the clock edge of the current frame with pre-filter, noise reduction and other preprocessing parameters and using a joint decision judgment algorithm to determine the type of the audio frame. The joint decision judgment algorithm result is smoothed accordingly to ensure the stable output of the joint discriminator.

Figure 4:
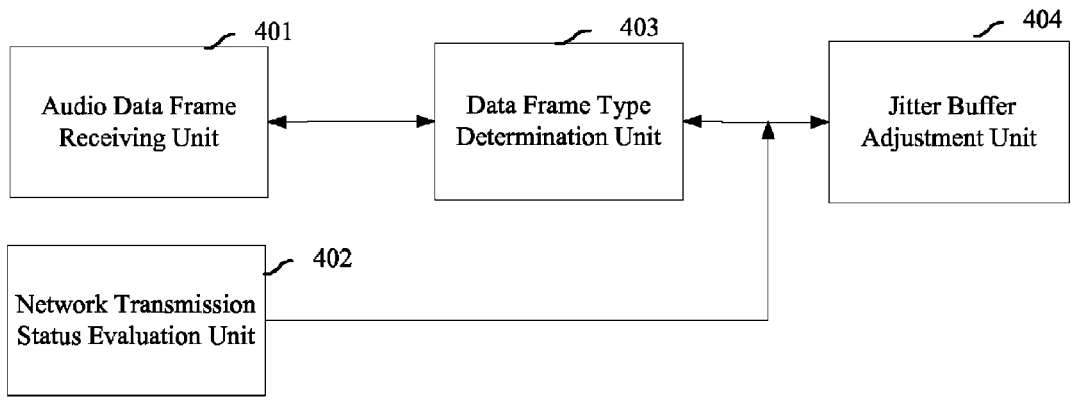
FIG. 4 illustrates a structure diagram of an exemplary audio playback apparatus consistent with the disclosed embodiments.

Base on the above description in details, an audio playback apparatus is provided. FIG. 4 illustrates a structure diagram of an exemplary audio playback apparatus consistent with the disclosed embodiments.

As shown in FIG. 4, the apparatus may include an audio data frame receiving unit 401, a network transmission status evaluation unit 402, a data frame type determination unit 403, and a jitter buffer adjustment unit 404.

The audio data frame receiving unit 401 is configured to receive an audio data frame. The network transmission status evaluation unit 402 is configured to evaluate network transmission status of the audio data frame. The data frame type determination unit 403 is configured to, based on an identification of the audio data frame, determine a type of the audio data frame.

The jitter buffer adjustment unit 404 is configured to, when the type of the audio data frame is a music frame and evaluation result of the network transmission status does not meet a preset transmission baseline condition, adjust a threshold value of the jitter buffer that is used to cache the audio data frame.

In one embodiment, the network transmission status evaluation unit 402 is configured to calculate the packet loss rate of the audio data frame by a packet sequence number.

The jitter buffer adjustment unit 404 is configured to, when the type of the audio data frame is a music frame and the packet loss rate of the audio data frame is higher than a preset threshold of the packet loss rate, increase the threshold value of the jitter buffer that is used to cache the audio data frame.

In one embodiment, the network transmission status evaluation unit 402 is configured to calculate the network jitter index by packet arrival time.

The jitter buffer adjustment unit 404 is configured to, when the type of the audio data frame is a music frame and the network jitter index is higher than a preset threshold of the network jitter index, increase the threshold value of the jitter buffer that is used to cache the audio data frame.

In one embodiment, the network transmission status evaluation unit 402 is configured to calculate the packet loss rate of the audio data frame by a packet sequence number and calculate the network jitter index by packet arrival time.

The jitter buffer adjustment unit 404 is configured to, when the type of the audio data frame is a music frame, the packet loss rate of the audio data frame is higher than the preset threshold of the packet loss rate, and the network jitter index is higher than the preset threshold of the network jitter index, increase the threshold value of the jitter buffer that is used to cache the audio data frame.

Base on the above description in details, an audio playback system is also provided.

Figure 5:
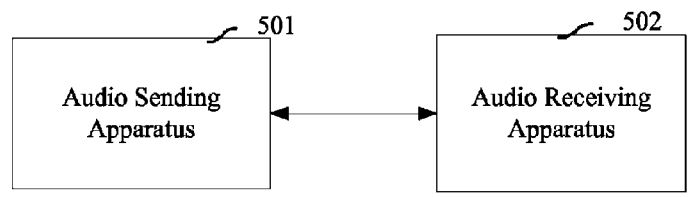
FIG. 5 illustrates a structure diagram of an exemplary audio playback system consistent with the disclosed embodiments.

FIG. 5 illustrates a structure diagram of an exemplary audio playback system consistent with the disclosed embodiments. As shown in FIG. 5, the system may include an audio sending apparatus 501 and an audio receiving apparatus 502.

The audio sending apparatus 501 is configured to capture an audio data frame, identify the captured audio data frame according to a type of the audio data frame, and send the identified audio data frame to the audio receiving apparatus 502.

The audio receiving apparatus 502 is configured to receive the identified audio data frame, to determine the type of the audio data frame based on the identification, and to evaluate network transmission status. When the type of the audio data frame is a music frame and evaluation result of the network transmission status does not meet a preset transmission baseline condition, a threshold value of the jitter buffer that is used to cache the audio data frame is adjusted.

In one embodiment, the audio receiving apparatus 502 is configured to calculate the packet loss rate of the audio data frame by a packet sequence number. When the type of the audio data frame is a music frame and the packet loss rate of the audio data frame is higher than a preset threshold of the packet loss rate, the threshold value of the jitter buffer that is used to cache the audio data frame is increased.

In one embodiment, the audio receiving apparatus 502 is configured to calculate the network jitter index by packet arrival time. When the type of the audio data frame is a music frame and the network jitter index is higher than a preset threshold of the network jitter index, the threshold value of the jitter buffer that is used to cache the audio data frame is increased.

In one embodiment, the audio receiving apparatus 502 is configured to calculate the packet loss rate of the audio data frame by the packet sequence number and calculate the network jitter index by the packet arrival time. When the type of the audio data frame is a music frame, the packet loss rate of the audio data frame is higher than the preset threshold of the packet loss rate, and the network jitter index is higher than the preset threshold of the network jitter index, the threshold value of the jitter buffer that is used to cache the audio data frame is increased.

In one embodiment, the audio sending apparatus 501 is configured to calculate the frame energy of the audio data frame and compare the frame energy with a preset frame energy threshold value. If the frame energy is lower than the preset frame energy threshold value, the audio data frame is identified as a mute frame. If the frame energy is higher than the preset frame energy threshold value, the speech probability density Ps and the music probability density Pm of the audio data frame are further calculated. If Ps/Pm is higher than a preset threshold value, the audio data frame is identified as a speech frame.

In one embodiment, the audio sending apparatus 501 is configured to further jointly judge the audio data frame and identify the audio data frame according to the type of the audio data frame based on the joint determination result when Ps/Pm is not higher than the preset threshold value.

Figure 6:
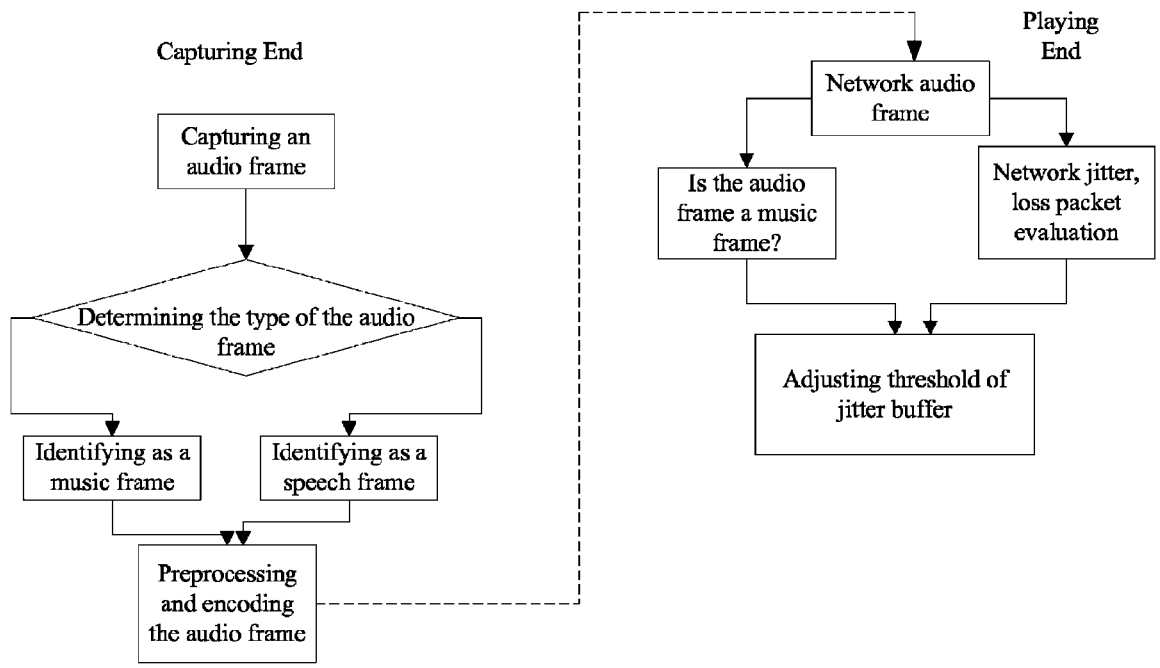
FIG. 6 illustrates an overall processing flowchart of audio playback consistent with the disclosed embodiments.

FIG. 6 is an overall processing flowchart of audio playback consistent with the disclosed embodiments.

As shown in FIG. 6, at the beginning, an audio capturing end may use various audio capture devices to capture audio frames and perform a preprocess operation, including pre-filter and noise reduction, on the captured data. Then, time-domain and frequency-domain analysis are performed on the preprocessed data, respectively.

The time-domain analysis includes mainly pitch extraction, a standard deviation of the pitches, zero-crossing rates (ZCR), and energy-zero-quotient (EZQ) extraction. For example, the ZCR in the music frame is greater than the ZCR in the speech frame.

The frequency-analysis includes performing a Fast Fourier Transform (FFT) algorithm and then extracting Mel frequency cepstral coefficients (MFCC), spectral entropy, energy distribution in the energy spectral density, spectral centroid of a signal, and a spectral width coefficient, etc., from spectrum coefficients, respectively.

Further, the audio capturing end inputs the extracted time-domain and frequency-domain coefficients to a decision-making module. Thus, a type flag of the frame is outputted. The judgment result from decision-making module is correspondingly smoothed to ensure that the results are not frequently switched.

Further, the audio capturing end encodes the audio frame data and sends the identified audio data frame to an audio playing end through various networks.

The audio playing end receives the identified audio data frame, determine the type of the audio data frame based on the identification (e.g., the type flag), and evaluate network transmission status. When the type of the audio data frame is a music frame and evaluation result of the network transmission status does not meet a preset transmission baseline condition, a threshold value of the jitter buffer that is used to cache the audio data frame is adjusted. More specifically, the followings may be performed.

(1) The audio playing end may calculate the packet loss rate of the audio data frame by a packet sequence number. For example, a total number of packets may be determined and missing packets may also be determined to calculate the packet loss rate. When the type of the audio data frame is a music frame and the packet loss rate of the audio data frame is higher than a preset threshold of the packet loss rate, the threshold value of the jitter buffer that is used to cache the audio data frame is increased.

(2) The audio playing end may calculate the network jitter index by packet arrival time. When the type of the audio data frame is a music frame and the network jitter index is higher than a preset threshold of the network jitter index, the threshold value of the jitter buffer that is used to cache the audio data frame is increased.

(3) The audio playing end may calculate the packet loss rate of the audio data frame by the packet sequence number and calculate the network jitter index by the packet arrival time. When the type of the audio data frame is a music frame, the packet loss rate of the audio data frame is higher than the preset threshold of the packet loss rate, and the network jitter index is higher than the preset threshold of the network jitter index, the threshold value of the jitter buffer that is used to cache the audio data frame is increased.

Further, there are various forms to implement the audio playback method, apparatus and system.

For example, based on a standardized application program interface, the audio playback method may be implemented by a plug-in that is installed in a browser or a packaged application that can be downloaded by a user. The plug-in can be written and implemented by file types, such as Dynamic Link Library (DLL), Object Linking and Embedding Control Extension (OCX), cabinet (CAB), etc. The audio playback method, apparatus and system can also be implemented by Flash plugin, RealPlayer plug-in, MMS plugin, MI stave plugin, and ActiveX plug-in technologies.

The user may capture and play the audio data on various terminals. The terminals may include but not limited to a feature phone, a smart phone, a personal computer (PC), a tablet, or a personal digital assistant (PDA), etc.

The browsers may include Microsoft Internet Explorer, Mozilla Firefox, Apple Safari, Opera, Google Chrome browser, GreenBrowser, etc. It should be noted that the implementation is not limited to the above browsers. The implementation may be applied to any application that can be used to display web servers or files with the file systems and allow the user to interact with files. The application can be various common browsers or any other application with a web browsing function.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed method, an audio sending end identifies a captured audio data frame according to a type of the audio data frame, and sends the identified audio data frame. After receiving the identified audio data frame, based on the identification, an audio receiving end determines the type of the audio data frame and evaluates network transmission status. When the type of the audio data frame is a music frame and evaluation result of the network transmission status does not meet a preset transmission baseline condition, a threshold value of the jitter buffer that is used to cache the audio data frame is adjusted. Therefore, based on the type of the audio data frame, network jitter and packet loss rate, a threshold value of the jitter buffer that is used to cache the audio data frame is estimated and set. When the type of the audio data frame is a music frame and the packet loss rate of the audio data frame is higher than a preset threshold of the packet loss rate, the threshold value of the jitter buffer that is used to cache the audio data frame is increased. Thus, more time may be provided for retransmitting the networking audio packets by increasing the threshold value of the jitter buffer that is used to cache the audio data frame. At the same time, a larger threshold value of the jitter buffer can smooth more and larger network jitters.

What is claimed is:

1. An audio playback method, comprising:
identifying, by an audio sending end, a captured audio data frame according to a type of the audio data frame;
sending, by the audio sending end, the identified audio data frame to an audio receiving end;
receiving, by the audio receiving end, the audio data frame that is identified according to the type of the audio data frame;
based on the identification, determining, by the audio receiving end, the type of the audio data frame and an evaluation result of network transmission status; and
when the type of the audio data frame is a music frame and evaluation result of the network transmission status does not meet a preset transmission baseline condition, adjusting, by the audio receiving end, a threshold value of a jitter buffer that is used to cache the audio data frame;
wherein identifying the captured audio data frame according to the type of the audio data frame further includes:
calculating frame energy of the audio data frame; and
comparing the frame energy of the audio data frame with a preset frame energy threshold value, wherein:
when the frame energy is lower than the preset frame energy threshold value, the audio data frame is identified as a mute frame;
when the frame energy is higher than the preset frame energy threshold value, the speech probability density Ps and the music probability density Pm of the audio data frame are further calculated; and
when Ps/Pm is higher than a preset threshold value, the audio data frame is identified as a speech frame.

2. The method according to claim 1, wherein:
evaluating network transmission status further includes calculating a packet loss rate of audio data frames by a packet sequence number; and
adjusting a threshold value of the jitter buffer further includes, when the type of the audio data frame is a music frame and the packet loss rate of the audio data frames is higher than a preset threshold of the packet loss rate, increasing the threshold value of the jitter buffer that is used to cache the audio data frame.

3. The method according to claim 1, wherein:
evaluating network transmission status further includes calculating a network jitter index by packet arrival time; and
adjusting a threshold value of the jitter buffer further includes, when the type of the audio data frame is a music frame and the network jitter index is higher than a preset threshold of the network jitter index, increasing the threshold value of the jitter buffer that is used to cache the audio data frame.

4. The method according to claim 1, wherein:
evaluating network transmission status further includes calculating the packet loss rate of the audio data frame by the packet sequence number and calculating the network jitter index by the packet arrival time; and
adjusting a threshold value of the jitter buffer that is used to cache the audio data frame further includes, when the type of the audio data frame is a music frame, the packet loss rate of the audio data frame is higher than the preset threshold of the packet loss rate, and the network jitter index is higher than the preset threshold of the network jitter index, increasing the threshold value of the jitter buffer that is used to cache the audio data frame.

5. The method according to claim 1, further including:
when Ps/Pm is not higher than the preset threshold value, jointly judging the audio data frame and identifying the audio data frame according to the type of the audio data frame.

6. An audio playback apparatus, comprising: one or more processors; memory; and one or more computer programs stored in the memory and to be executed by the one or more processors, the one or more programs comprising:
an audio data frame receiving unit configured to receive an audio data frame, wherein the audio data frame is identified by an audio sending end according to a type of the audio data frame;
a network transmission status evaluation unit configured to evaluate network transmission status of the audio data frame;
a data frame type determination unit configured to, based on an identification of the audio data frame, determine a type of the audio data frame; and
a jitter buffer adjustment unit configured to, when the type of the audio data frame is a music frame and evaluation result of the network transmission status does not meet a preset transmission baseline condition, adjust a threshold value of a jitter buffer that is used to cache the audio data frame;
wherein identifying the audio data frame according to the type of the audio data frame further includes:
calculating frame energy of the audio data frame; and
comparing the frame energy of the audio data frame with a preset frame energy threshold value, wherein:
when the frame energy is lower than the preset frame energy threshold value, the audio data frame is identified as a mute frame;
when the frame energy is higher than the preset frame energy threshold value, the speech probability density Ps and the music probability density Pm of the audio data frame are further calculated; and
when Ps/Pm is higher than a preset threshold value, the audio data frame is identified as a speech frame.

7. The apparatus according to claim 6, wherein:
the network transmission status evaluation unit is configured to calculate a packet loss rate of the audio data frame by a packet sequence number; and
the jitter buffer adjustment unit is configured to, when the type of the audio data frame is a music frame and the packet loss rate of the audio data frame is higher than a preset threshold of the packet loss rate, increase the threshold value of the jitter buffer that is used to cache the audio data frame.

8. The apparatus according to claim 6, wherein:
the network transmission status evaluation unit is configured to calculate a network jitter index by packet arrival time; and
the jitter buffer adjustment unit is configured to, when the type of the audio data frame is a music frame and the network jitter index is higher than a preset threshold of the network jitter index, increase the threshold value of the jitter buffer that is used to cache the audio data frame.

9. The apparatus according to claim 6, wherein:
the network transmission status evaluation unit is configured to calculate the packet loss rate of the audio data frame by the packet sequence number and calculate the network jitter index by the packet arrival time; and
the jitter buffer adjustment unit is configured to, when the type of the audio data frame is a music frame, the packet loss rate of the audio data frame is higher than the preset threshold of the packet loss rate, and the network jitter index is higher than the preset threshold of the network jitter index, increase the threshold value of the jitter buffer that is used to cache the audio data frame.

10. An audio playback system, comprising:
an audio sending apparatus; and
an audio receiving apparatus, wherein:
the audio sending apparatus is configured to:
 capture an audio data frame;
 identify the captured audio data frame according to a type of the audio data frame; and
 send the identified audio data frame to the audio receiving apparatus, and the audio receiving apparatus configured to:
 receive the identified audio data frame;
 determine the type of the audio data frame based on an identification; and
 evaluate network transmission status, wherein, when the type of the audio data frame is a music frame and an evaluation result of the network transmission status does not meet a preset transmission baseline condition, a threshold value of the jitter buffer that is used to cache the audio data frame is adjusted;
wherein the audio sending apparatus is configured to calculate frame energy of the audio data frame and compare the frame energy with a preset frame energy threshold value, wherein:

when the frame energy is lower than the preset frame energy threshold value, the audio data frame is identified as a mute frame;
when the frame energy is higher than the preset frame energy threshold value, the speech probability density Ps and the music probability density Pm of the audio data frame are further calculated; and
when Ps/Pm is higher than a preset threshold value, the audio data frame is identified as a speech frame.

11. The system according to claim 10, wherein:
the audio receiving apparatus is configured to:
calculate a packet loss rate of the audio data frame by a packet sequence number; and
when the type of the audio data frame is a music frame and the packet loss rate of the audio data frame is higher than a preset threshold of the packet loss rate, increase the threshold value of the jitter buffer that is used to cache the audio data frame.

12. The system according to claim 10, wherein:
the audio receiving apparatus is configured to:
calculate a network jitter index by packet arrival time; and
when the type of the audio data frame is a music frame and the network jitter index is higher than a preset threshold of the network jitter index, increase the threshold value of the jitter buffer that is used to cache the audio data frame.

13. The system according to claim 10, wherein:
the audio receiving apparatus is configured to:
calculate the packet loss rate of the audio data frame by the packet sequence number and calculate the network jitter index by packet arrival time; and
when the type of the audio data frame is a music frame, the packet loss rate of the audio data frame is higher than a preset threshold of the packet loss rate, and the network jitter index is higher than a preset threshold of the network jitter index, increase the threshold value of the jitter buffer that is used to cache the audio data frame.

14. The system according to claim 10, wherein:
the audio sending apparatus is configured to, when Ps/Pm is not higher than the preset threshold value, jointly judge the audio data frame and identify the audio data frame according to the type of the audio data frame.

15. The apparatus according to claim 6, wherein comparing the frame energy of the audio data frame with a preset frame energy threshold value further includes:
when Ps/Pm is not higher than the preset threshold value, jointly judging the audio data frame and identifying the audio data frame according to the type of the audio data frame.

\* \* \* \* \*